UNITED STATES PATENT OFFICE.

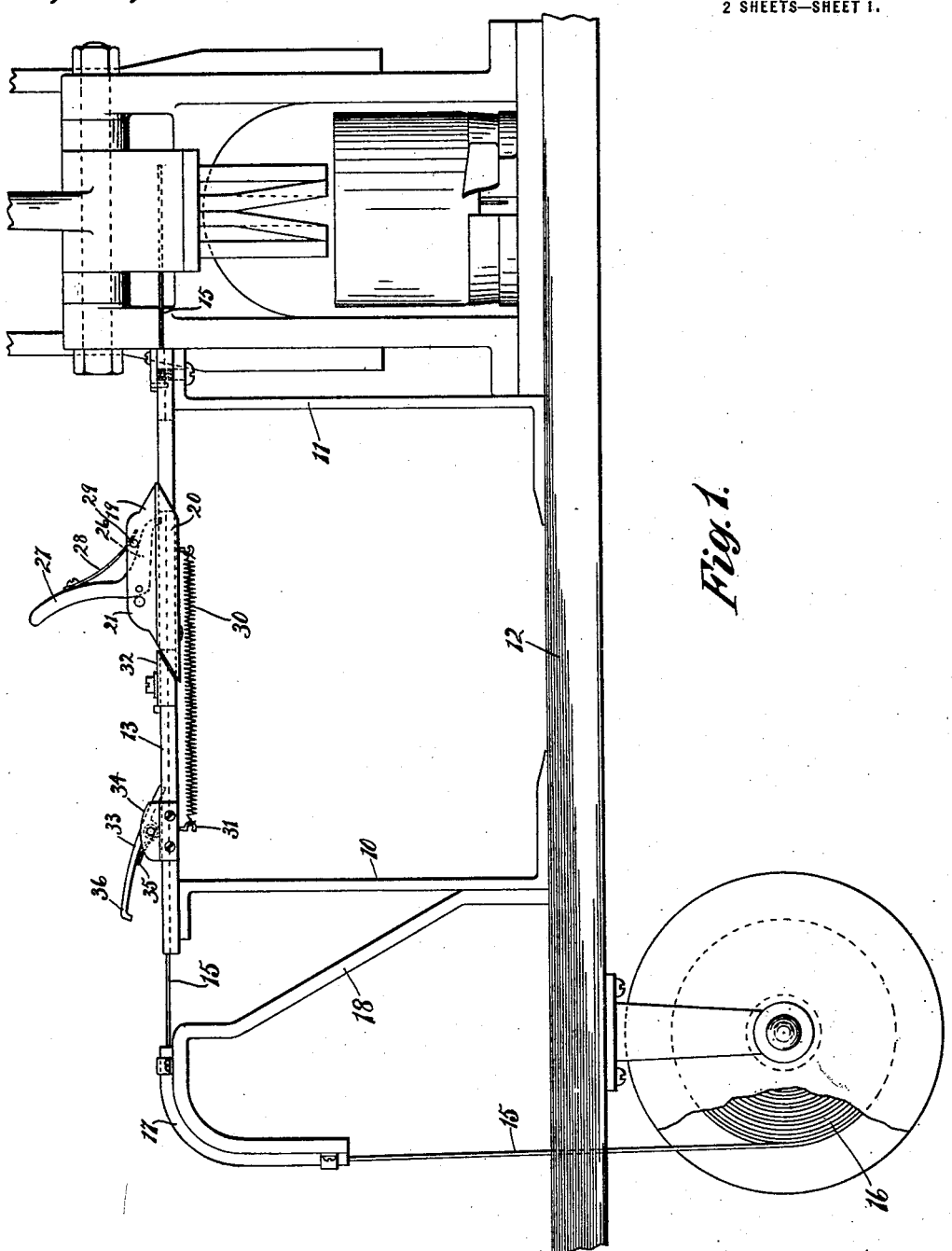

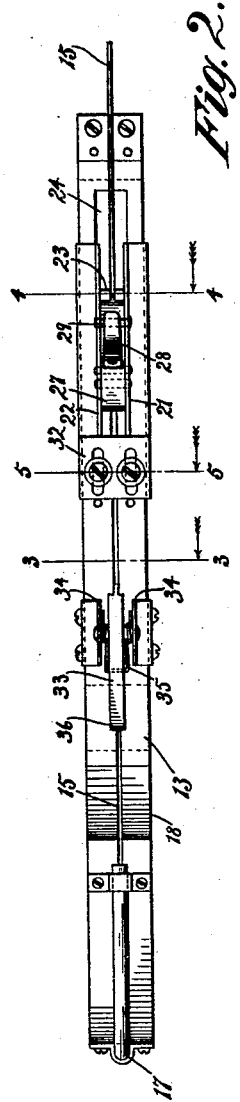
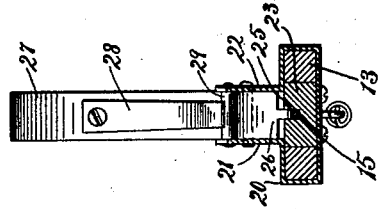
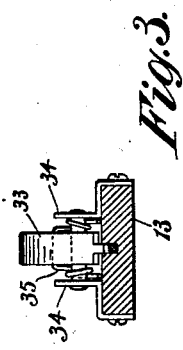
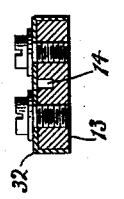

BRUNO W. SEIDEL AND GEORGE E. WATTMAN, OF CHICAGO, ILLINOIS, ASSIGNORS TO THE ADAMS & WESTLAKE COMPANY, OF CHICAGO, ILLINOIS, A CORPORATION OF ILLINOIS.

SOLDER-FEEDING MACHINE.

1,309,107.  Specification of Letters Patent.  Patented July 8, 1919.

Application filed April 24, 1916. Serial No. 93,214.

*To all whom it may concern:*

Be it known that we, BRUNO W. SEIDEL and GEORGE E. WATTMAN, citizens of the United States, and residents of Chicago, county of Cook and State of Illinois, have jointly invented certain new and useful Improvements in Solder-Feeding Machines, of which the following is a specification, and which are illustrated in the accompanying drawings, forming a part thereof.

The invention relates to devices adapted for feeding solder in wire form to an apparatus, such as a cutter, by which it is to be further operated upon.

The object of the invention is to provide a simple and efficient device for intermittently feeding the solder from a coil or spool; and it consists in a structure such as hereinafter described and illustrated in the accompanying drawings, in which—

Figure 1 is a side elevation of the apparatus shown in connection with a cutting and distributing device, some parts being broken away;

Fig. 2 is a plan view of the feeder; and

Figs. 3, 4 and 5 are sectional views on the lines 3—3, 4—4 and 5—5, respectively, of Fig. 2.

The feeding mechanism is preferably mounted on suitable standards, as 10, 11, rising from a table or bench 12. Upon the standards 10, 11, there is fixed a bar 13, constituting the bed of the machine, having a longitudinal channel 14 within which the solder in wire form, as shown at 15, is adapted to run, being led from a coil or spool, as shown at 16, which may be suspended below the table or bench 12. A guide tube 17, carried upon a bracket 18 shown as secured to one of the standards, as 10, leads the solder from the coil to the channel 14, and in addition to its guiding function serves the purpose of straightening the solder should it not be free from kinks,— the tube being bent through a ninety degree angle.

A carriage 19 reciprocates upon the bar 13 and comprises a sheet metal body portion 20, and having a pair of upstanding ears 21, 22. Within the body portion 20 is fixed a block 23, which slides within an aperture 24 in the bar 13 and is provided with a channel 25 in alinement with the channel 14. A clamping finger 26 is pivoted between the ears 21, 22, and is adapted to enter the channel 25 to bind the wire to the block 23. This finger is provided with an upstanding arm 27, by which it may be manually controlled, and is normally raised by means of a spring 28, shown as attached to the arm 27 and bearing upon a pin 29 set through the ears 21, 22. A spring 30, attached to the carriage and anchored, as shown at 31, to the bar 13, retracts the carriage after each advance movement, a stop plate 32 being attached to the upper face of the bar 13 to limit the backward movement.

A holding device is provided for preventing the retrograde movement of the solder, and, as shown, comprises a finger 33, pivoted between ears 34 rising from the bar 13 and adapted to enter the channel 14, as shown in Fig. 3,—a spring 35 being provided for pressing the finger down upon the solder. This finger is provided with a backwardly projecting arm 36, by which it may be raised should it be desired to withdraw the solder from the feeding channel.

In use the operator applies his finger to the rear side of the arm 27, and pressing forwardly first throws the finger 26 down upon the solder, firmly clutching it to the block 23,—continued pressure moving the carriage forward and with it the solder, until the block reaches the forward end of the aperture 24. The pressure being released the finger is disengaged from the solder and the carriage automatically withdrawn.

We claim as our invention—

1. In a machine for feeding wire solder, in combination, a bed having a solder guiding groove and a slot, a block sliding in said slot and having a groove in alinement with said guide groove, a carriage traveling with said block and having a normally retracted wire gripping member pivoted thereon for gripping the solder against said block, and a finger lever adapted to simultaneously depress said grip and advance said carriage and block.

2. In a machine for feeding wire solder, in combination, a bed having a solder guiding groove and a longitudinal slot, a spring retracted carriage comprising a sleeve surrounding said bed, a pair of upstanding ears on said carriage, a block secured to said carriage sliding in said slot and provided with a groove alining with said guide groove, a bell crank shaped lever pivoted at its angle between said ears with one member upstanding and adapted when actuated to grip the solder against said block by pressure of one end of the lever thereon, whereby forward pressure upon the upstanding member of the lever will grip the solder and advance solder and carriage.

BRUNO W. SEIDEL.
GEORGE E. WATTMAN.

Copies of this patent may be obtained for five cents each, by addressing the "Commissioner of Patents, Washington, D. C."